United States Patent [19]

Menke

[11] 4,055,094
[45] Oct. 25, 1977

[54] METHOD FOR PROTECTING STATOR WINDINGS OF DYNAMOELECTRIC MACHINE

[75] Inventor: Curtis M. Menke, Hendersonville, Tenn.

[73] Assignee: General Electric Company, Schenectady, N.Y.

[21] Appl. No.: 729,450

[22] Filed: Oct. 4, 1976

[51] Int. Cl.² ............................................. B23B 1/00
[52] U.S. Cl. .................................... 82/1 C; 82/34 R; 29/596
[58] Field of Search .................. 82/1 C, 34 R; 29/596

[56] References Cited

U.S. PATENT DOCUMENTS

| | | | |
|---|---|---|---|
| 2,819,417 | 1/1958 | Glass | 29/596 |
| 2,967,346 | 1/1961 | McMaster et al. | 29/596 |
| 3,538,598 | 11/1970 | Wightman et al. | 29/596 |
| 3,608,406 | 9/1971 | Paysinger et al. | 82/1 C |

Primary Examiner—Leonidas Vlachos
Attorney, Agent, or Firm—Vale P. Myles

[57] ABSTRACT

A method for protecting the stator windings of a dynamoelectric machine from metal fragments during machining operations that are performed on a housing portion of the dynamoelectric machine during its initial manufacture. The method is characterized by providing removable shields that are selectively positioned over the stator windings to isolate them from the areas of the housing being machined during the machining operation. The shields are effective to prevent any metal shavings, chips or other fragments developed during the machining operation from entering or otherwise contacting the stator windings. After the machining operations are completed, the shields are removed from their respective positions over the stator windings and further fabrication of the machine is then undertaken.

9 Claims, 2 Drawing Figures

METHOD FOR PROTECTING STATOR WINDINGS OF DYNAMOELECTRIC MACHINE

BACKGROUND OF THE INVENTION

The invention relates to a method for manufacturing dynamoelectric machines and more particularly relates to a method for protecting the stator windings of such a machine from damage due to having metal fragments lodged therein during a manufacturing process in which metal shavings or chips are cut from portions of the machine housing.

It was common practice before the present invention to perform various machining operations on the housings of dynamoelectric machines during the course of their manufacture in order to appropriately size the machine housing and to provide rabbetted surfaces cut to appropriate tolerances. Characteristically, such machining operations are performed on the housing after a stator and stator winding are assembled in the housing. Inevitably such machining operations result in a large number of metal chips and shavings being lodged in and around the stator windings of the machines. If those metal fragments were allowed to remain in the windings, they could result in various forms of failure of the machine when it is placed in operation. For example, the metal fragments could work down into the winding insulation and eventually cut it to cause an electrical short circuit between the winding coils, or to cause an electrical grounding failure in the machine. Alternatively, the metal fragments might work their way into the machine air gap and cause a breakdown of insulation that could completely burn out the rotor or stator windings.

In the past, such undesirable consequences were successfully avoided by carefully extracting all metal fragments from the stator windings of the machines before they were placed in use. For electric machines having cast iron or steel housings, such removal operations are usually facilitated by applying a magnetic field to the components of the machine sub-assembly to assist a fan or blower means in extracting the loose metal fragments from the windings. However, for machines that utilize non-ferrous metals for the housing, such as machines having aluminum housings, it is necessary to rely on extraction means other than magnetic fields. In fact, practical experience has demonstrated that once aluminum cutting chips become lodged in the stator windings of a dynamoelectric machine it is very time consuming and frequently nearly impossible to extract all of the chips before the machine is placed in use.

This problem is complicated by the fact that high volume production of relatively small dynamoelectric machines of the type commonly employing aluminum housings is normally characterized by sizing and rabbetting operations that utilize high speed cutting rates for these cutting tools. Consequently, the machining operations produce a profusion of metal chips and fragments that are scattered in all directions in and around the stator windings. Attempts to air blow or vacuum these particles from the windings is partially frustrated by the typically curled or sharply angled configurations of the chips and shavings that are cut from the housings during such machining operations. These twisted metal particles become tightly hooked into the interstices of the stator windings and frequently are almost impossible to remove.

In addition to the vacuuming and blowing operations mentioned above that are conventional techniques for attempting to remove machining fragments from the windings of dynamoelectric machines, it is known that some attempts have been made to employ wide rubber bands to at least partially cover the outside diameter of the end turns of stator coils during such machining operations in an attempt to block metal fragments from ever becoming lodged on the outer surfaces of the windings. However, that technique has been only partially successful in attaining the desirable objective of preventing metal fragments from being lodged in the windings. As mentioned above, the high rates of cutting used in performing many machining operations on aluminum motor housings results in metal chips and shavings being thrown in large volume in many directions over the housings and inevitably some of these chips enter the internal area of even such partially shielded stator windings, so the chips become lodged and difficult or impossible to remove without damaging the windings.

In addition to their inability to completely protect the stator windings from metal fragments developed by the machining operations normally performed on a stator housing after a stator is mounted in it, the wide rubber band used in prior art techniques to partially cover the exterior surface of the stator windings were found objectionable due to the need to custom fabricate different sizes of rubber bands for various different sizes of stator end turns that are inevitably encountered in manufacturing a range of ratings of dynamoelectric machines. Thus, it would be desirable to not only provide a means for effectively isolating the stator windings of dynamoelectric machines from metal fragments machined off of the stator housings of the machines during their manufacture, but it would be desirable to provide such means in a form that could readily accommodate a large number of different lengths of stator end turns so that it would not be necessary to either custom make a number of different shielding means or to custom install shielding means carefully over each end turn arrangement of the stator windings of given machines.

OBJECTS OF THE INVENTION

Accordingly, it is a primary object of the invention to provide a method for manufacturing dynamoelectric machines that economically overcomes the above-noted disadvantages of prior art manufacturing techniques.

An additional object of the invention is to provide a method for manufacturing dynamoelectric machines whereby the stator windings of such machines are completely isolated from portions of the stator housings that are machined to cut them to given tolerances during the manufacture of the machines.

A further object of the invention is to provide a manufacturing method for making dynamoelectric machines having aluminum housings in which removable shields are disposed within the aluminum housings of the machines, around the stator windings mounted therein, in a manner such that different lengths of stator windings are readily accommodated by the shields and all metal fragments are completely blocked from contact with the stator windings.

Additional objects and advantages of the invention will become apparent to those skilled in the art from the description of it that follows taken in connection with the accompanying drawing.

SUMMARY OF THE INVENTION

In one preferred arrangement of the invention, a manufacturing method is provided for completely protecting stator windings of a dynamoelectric machine from metal fragments developed by cutting operations performed on the stator housing of the machine prior to its final assembly. Pursuant to the invention a stator housing having a stator and stator winding mounted therein is rotatably supported on the headstock arbor of a relatively conventional lathe, then a shield is positioned within one end of the housing, around the stator winding therein to form a barrier between the interior surface of the dynamoelectric machine housing and the arbor. A flexible diaphragm is inserted into the other end of the dynamoelectric machine housing and is forced toward the stator winding at that end of the housing by the tailstock of the lathe. The flexible diaphragm forms a seal between the interior surface of the dynamoelectric machine housing and the tailstock so that when the lathe cutting-bits are employed to rapidly machine the housing to size and to form rabbet fittings therein, all of the resultant metal chips and shavings are prevented from contacting the stator windings. After the machining operations are performed, the flexible diaphragm and shield inserted respectively within opposite ends of the dynamoelectric machine housing are removed therefrom so that subsequent assembly operations may be performed on the dynamoelectric machine.

BRIEF DESCRIPTION OF THE PREFERRED METHOD OF THE INVENTION

Figure 1:
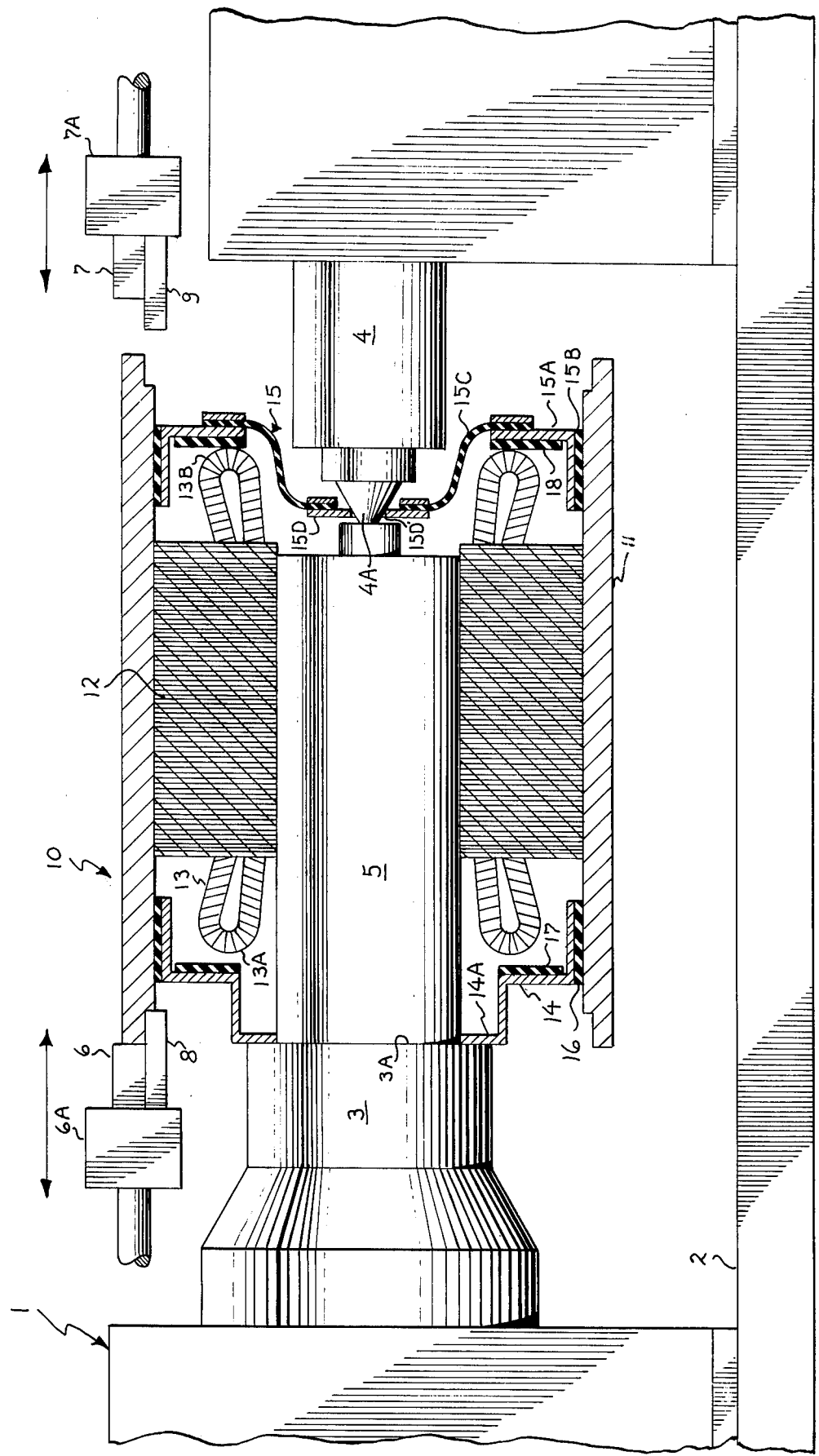
FIG. 1 is a side elevation view, partly in cross-section, showing part of a lathe for machining the housings of dynamoelectric machines and illustrating in respect thereto the novel shield and diaphragm or baffle members that are used in practicing the manufacturing method of the invention.

Before describing the preferred sequence of operating steps of the method of the invention, reference will be made to FIG. 1 of the drawing in which there is partially illustrated a relatively conventional lathe 1 having a supporting frame 2 on which there is rotatably mounted a headstock arbor 3 and a reciprocally operable tailstock 4 that is mounted coaxially with the arbor in conventional fashion. The inner end of arbor 3 is provided with a radially expandable mandrel 5 that is operable to receive thereon a motor housing and secure it for rotation with the arbor 3. Reciprocally mounted in any suitable conventional manner on the base 2 of the lathe 1 are a first cutting bit 6 and a second cutting bit 7 that are mounted on reciprocally slidable supports 6A and 7A respectively. These supports are also shown with second cutting bits 8 and 9 mounted respectively thereon for cutting rabbet grooves in a motor housing. Although various conventional lathes may be used in practicing the method of the invention, in the preferred arrangement the lathe 1 is a Gisholt Masterline No. 12 Automatic Production lathe that is commercially available from the Gisholt Machine Company of Madison, Wis. One such suitable lathe is identified by Gisholt Serial No. 4803X9.

Shown mounted on the lathe 1 in FIG. 1 in a position for performing a machining operation thereon is a dynamoelectric machine sub-assembly 10 comprising a generally cylindrical aluminum housing 11 having a stack of magnetic stator laminations 12 mounted therein with a stator winding 13 disposed in slots of the stator 12 in a suitable conventional manner. One end of the stator winding is identified by the reference number 13A while the other end of the stator winding is designated by the reference number 13B herein. It will be understood that the expandable mandrel 5 is operable to contract its individual fingers (which may be of any conventional form) to a reduced diameter position that the bore through the stator 12 is readily slid over the mandrel, at which point the fingers of the mandrel 5 are radially expanded outwardly to firmly contact the internal surface of the bore through the stator 12, thus securing the stator and the housing 11 for rotation on the arbor 3 of lathe 1. Also, those familiar with the operation of such lathes will recognize that after the mandrel 5 has secured the stator in operating position thereon, the reciprocal tailstock 4 will be advanced to center its point 4A on the center axis line of the mandrel 5 thereby to stabilize the rotation of the arbor 3 and the workpiece (machine assembly 10) mounted thereon.

Also depicted in operating relationship on the lathe 1 in FIG. 1 are a generally cup-shaped shield 14 and a flexible diaphragm 15 that are used in practicing the method of the invention to protect the stator winding 13 from metal fragments developed by machining operations on the aluminum housing 11. In the preferred forms illustrated in FIG. 1, the shield 14 comprises an orthogonally stepped, cup-shaped annular member 14A having a bore through its center that fits snugly over a reached diameter portion of the arbor and abuts a shoulder 3A on the arbor. The cup-shaped annular member 14A is secured in operating position against the shoulder 3A by the left end of the mandrel 5 which is forced against it as the mandrel is mounted in operating position on the arbor. In order to provide an effective seal between the outer peripheral surface of the annular part of shield 14A and the inner circumferential surface of one end of the aluminum housing 11, a band of suitably compressible material 16, such as foam rubber or polyurethane foam, is bonded to that part of the outer surface of the annular member 14A that is juxtaposed with the inner surface of housing 11.

In its most preferred form, the diaphragm 15 comprises a rigid annular member 15A that may be formed of steel or other suitable material. There is provided a compressible band of material 15B on the outer peripheral surface of the steel annulus 15A in order to prevent metal particles from passing between the diaphragm 15 and the inner circumferential surface of one end of the housing 11. The band of material 15B is similar to the band of material 16 on shield 14. Finally, the diaphragm 16 is provided with a flexible gum rubber cone portion 15C that has an aperture at its center in which there is secured in a suitable conventional manner a metal plate 15D having an aperture 15D' through the center thereof for slidably receiving therein the point 4A of tailstock 4.

Both the shield 14 and the flexible diaphragm 15 are provided with buffer means for protecting the stator winding 13 from damage should the shield or diaphragm be forced against the winding. These buffer means comprise bands of compressible material 17 and 18, such as annuli of flat flexible rubber, mounted respectively on the inner surface of the annular member 14A of the shield and the inner surface of the annulus 15A of the diaphragm 15. It will be seen that when the tailstock 4 is forced against the plate 15D of diaphragm 15, it will force the diaphragm 15 toward the end 13B of the stator winding 13. The foam rubber buffer 18 will thus be forced into engagement with the adjacent end 13B of the stator winding 13 and will serve to protect the winding from damage that might otherwise occur if they were contacted by the steel portion of the annulus 15A.

Figure 2:
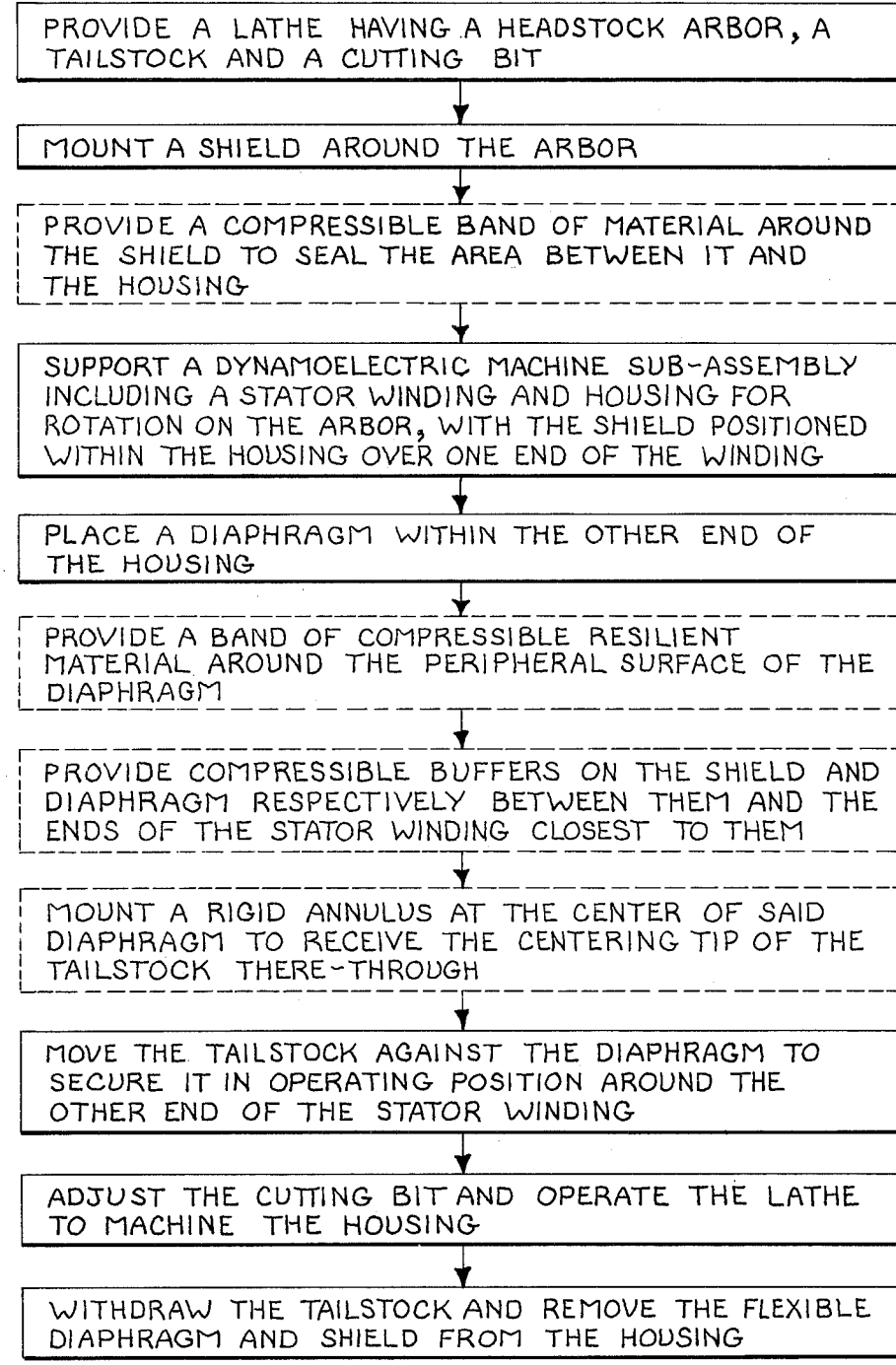
FIG. 2 is a flow chart illustrating the primary steps of the method of the invention and also illustrating alternative steps of a modification of the basic arrangement of the invention.

Now that a preferred embodiment of an apparatus useful in practicing the preferred method of the invention has been described, reference will be made to FIG. 2 of the drawing to explain the characteristic steps of the preferred form of the method of the invention. Keeping in mind the objectives of the invention that were set forth at the outset, and referring to the initial blocks of the flow diagram of FIG. 2, it will be seen that the method of the invention in its preferred arrangement is generally described by the flow diagram. Thus, the first preferred step in processing the arrangement of the method of the invention described herein is the providing of a lathe, such as the lathe 1 shown in FIG. 1, which has a rotatable headstock arbor, a tailstock reciprocally mounted coaxially with the arbor and at least one cutting tool movably supported radially outward from the arbor. Actually, as noted above, the lathe 1 preferably includes four cutting tools, 6 through 9, which are operable to simultaneously size the axial length of the aluminum frame 11 (cutting tools 6 and 7) and to undercut a rabbet groove (tools 8 and 9) in the opposite end of the housing 11.

Next, the method of the invention involves mounting a shield 14 around the arbor 3 for rotation with it. As explained above, the shield 14 is preferably supported in rotating position on the arbor 3 by being clamped against a shoulder 3A on the arbor by the mandrel 5. With the shield 14 thus secured in operating position, a dynamoelectric machine subassembly 10 is supported on the mandrel 5 and fixed in rotatable position on the arbor 3 in a position such that the shield 14 is at least partially disposed within one end of the housing 11 so that the peripheral surface of the shield 14 is in snug engagement with the circumferential surface of the housing 11 at a point thereon outward from one end (13A) of the stator winding 13 in the machine 10. When the machine 10 is secured for rotation on the arbor 3, the following step of the method of the invention comprises placing a flexible diaphragm 15 within the other end of the housing 11 so that the peripheral surface thereof bearing the foam rubber band 15B is positioned snugly against the circumferential inner surface of the housing 11 as shown in FIG. 1. Then, the tailstock 4 of the lathe 1 is moved axially against the central plate portion 15D of the diaphragm 15 to force the diaphragm to flex inward and move toward the end 13B of the stator winding 13, thus, securing the diaphragm in operating position against the stator winding for rotation with the housing 11. In this operating step of the method, it will be noted that the buffers 17 and 18 may or may not be in engagement with the respective opposite ends of the winding 13. However, should one of the buffers contact the winding, as buffer 18 is shown in contact with the end 13B of the winding, the buffers serve to protect the windings from injury.

The next step of this arrangement of the invention is adjusting the cutting tool (or tools) and rotating the housing 11 supported on the arbor 3 to thereby machine at least one end of the housing 11. Assuming that the tool 6 is first adjusted to perform a cutting operation on the end of the housing 11 adjacent the shield 14, it will be noted that the shield is effective to completely isolate the winding 13 from metal fragments such as metal chips and shavings that are cut from the housing 11 by the tool. In the most preferred operation of the invention, all four cutting bits 6–9 will be simultaneously placed in cutting relationship with the respective opposite ends of the housing 11 thereby developing a profusion of metal chips and shavings that will be thrown against the shield 14 and the flexible diaphragm 15. Due to the novel arrangement of these components, in practicing the method of the invention, the shield and diaphragm are effective to prevent any metal particles cut from housing 11 by the machining operation(s) from entering the stator winding 13.

Finally, the method of the invention is completed by withdrawing the tailstock 4 of the lathe, removing the diaphragm 15 from the housing 11 thereby to force any metal particles collected in the outer end of the housing 11 therefrom. The dynamoelectric machine 10 is then removed from the mandrel 5 thereby to slide the shield 14 from the other end of the housing 11 and force any metal particles collected in that end of the housing therefrom. By thus practicing the preferred arrangement of the method of the invention, it will be appreciated that the dynamoelectric machine sub-assembly 10 is immediately ready for further manufacturing operations to complete its manufacture to form a complete electric motor or generator. That is to say, it is not usually necessary to further clean the machine to remove metal particles therefrom, as was ordinarily required following such a machining operation on such a housing 11 with prior art methods.

From the foregoing description of the most preferred steps and sequence of steps of the method of the invention it will be appreciated that the objectives stated at the outset are fully met. However, as shown by dashed lines in FIG. 2, various modifications of the invention can be made to further enhance the results obtainable by practicing the invention. Thus, as shown by the uppermost dashed box in FIG. 2 the basic method of the invention can be improved (for some applications) by providing a compressible band, such as the foam rubber 16 shown in FIG. 1, around the peripheral surface of the shield 14 to better seal the area between it and the housing 11. Similarly, as indicated by the next dashed box shown in FIG. 2, the preferred method can be improved by providing a second band of compressible resilient material 15B around the peripheral surface of the diaphragm 15, as shown in FIG. 1. Also, compressible buffers such as the buffers 17 and 18 are most preferably mounted respectively on the shield 14 and the diaphragm 15 between them and the opposite ends 13A and 13B of the stator winding closest to the buffers. Finally, the basic preferred steps and sequence of the method of the invention can be improved by mounting a rigid annulus 15D at the center of the diaphragm 15 and providing it with an aperture 15D' that is effective to receive therein the centering tip 4A of the tailstock 4 of lathe 1 so that the tip 4A can best be centered on the center line of mandrel 5.

It will be apparent to those skilled in the art that various further modifications and improvements can be made in the invention from the description of it presented herein. Accordingly, it is my intention to encompass within the following claims the true spirit and scope of the invention.

What I claim and desire to secure by Letters Patent of the United States is:

1. A method for protecting the stator winding of a dynamoelectric machine from metal fragments while machining the housing of the machine, comprising the steps of:
 a. providing a lathe having; a rotatable headstock arbor, a tailstock reciprocally mounted coaxially with said arbor, and at least one cutting tool movably supported radially outward from said arbor,
 b. mounting a shield closely around part of the arbor for rotation therewith,
 c. supporting on the arbor for rotation therewith a dynamoelectric machine housing having a stator and stator winding assembly mounted therein spaced from the ends of the housing, said housing being supported to position said shield at least partially within one end of the housing with the peripheral surface of the shield in snug engagement with an inner circumferential surface housing at a point thereon outward from one end of said winding assembly,
 d. placing a flexible diaphragm within the other end of the housing with the peripheral surface of the diaphragm positioned snugly against an inner circumferential surface of the housing outward from the other end of the winding assembly,
 e. moving the tailstock against the central portion of the diaphragm to secure it in operating position for rotation with the housing,
 f. adjusting the cutting tool and rotating the housing supported on the arbor thereby to machine at least one end of the housing, said cup-shaped shield and said diaphragm being effective during said machining operation to prevent metal particles from entering said stator winding,
 g. withdrawing the tailstock, removing the diaphragm from the housing thereby to force collected metal particles from one end of the housing, and removing the housing from the arbor, thereby to slide the shield from the other end of the housing and force metal particles from said other end of the housing.

2. A method as defined in claim 1 further comprising the steps of providing said shield with a cup-shaped configuration and mounting a band of compressible resilient material around the peripheral surface thereof before it is positioned within one end of said housing.

3. A method as defined in claim 2 further comprising steps of providing said diaphragm with a rigid annulus at the periphery thereof, and mounting a band of compressible resilient material around the outermost surface of the annulus.

4. A method as defined in claim 3 further comprising the step of providing an aperture in the center of said diaphragm for receiving therethrough in sliding relationship therewith one end of the tailstock.

5. A method as defined in claim 4 further comprising the step of mounting a rigid plate on said diaphragm around said aperture, said plate being provided with an aperture that provides a bearing surface for said tailstock.

6. A method as defined in claim 5 further comprising the step of mounting a first resilient buffer on the inner surface of said annulus between it and the stator windings thereby to prevent the annulus from contacting the windings when the headstock is moved to force the diaphragm toward the winding thereby to secure the diaphragm in operating position for machining the housing.

7. A method as defined in claim 6 further comprising the step of mounting a second resilient buffer on the inner surface of said shield between it and the stator windings thereby to prevent the shield from engaging the windings.

8. A method as defined in claim 1 further comprising the step of mounting an expandable mandrel on said arbor for securing the housing in rotatable relationship on the arbor, by sandwiching said shield between a shoulder on the arbor and said mandrel, and securing said shield in position for rotation with the arbor and mandrel.

9. A method as defined in claim 8 including the step of providing at least one more cutting tool and reciprocally mounting said cutting tools respectively adjacent opposite ends of said housing thereby to provide means for simultaneously machining both ends of the housing when the shield and diaphragm are secured in their protective positions within the ends of the housing.

* * * * *